United States Patent [19]
Tortosa

[11] Patent Number: 5,688,542
[45] Date of Patent: Nov. 18, 1997

[54] CONTINUOUS CHEESE COAGULATION METHOD

[76] Inventor: Pedro J. Tortosa, 1431 Co. Rd. V., Houlton, Wis. 54082

[21] Appl. No.: 694,228

[22] Filed: Aug. 8, 1996

[51] Int. Cl.$^6$ .............................. A01J 25/00; A23C 19/00
[52] U.S. Cl. ............................ 426/36; 99/460; 99/466; 426/517; 426/582
[58] Field of Search ................... 426/36, 515, 517, 426/582; 99/452, 460, 466

[56] References Cited

U.S. PATENT DOCUMENTS 4,217,818  8/1980  Hazen ............................... 426/36
5,032,417  7/1991  Jay .................................. 426/582

*Primary Examiner*—George Yeung
*Attorney, Agent, or Firm*—Peter J. Georges

[57] ABSTRACT

A method of forming a continuous ribbon of cheese from precheese is described. A conveyor belt system is used, modified to retain and transport the liquid precheese which, over the course of conveyance, solidifies to form the continuous cheese product discharged at the end of the conveyor.

5 Claims, 2 Drawing Sheets

CONTINUOUS CHEESE COAGULATION METHOD

FIELD OF THE INVENTION

The invention relates generally to production of cheese from precheese and specifically to coagulation of precheese.

BACKGROUND OF THE INVENTION

Belt conveyors have been used in cheese production methods and conveyor installation has facilitated processing. One example of such production is described in U.S. Pat. No. 4,964,334 granted Oct. 23, 1990. Therein, there is described a method of processing of curd on a conveyor belt to separate whey from curd. In U.S. Pat. No. 4,309,941 granted Jan. 12, 1982, the use of a plurality of endless conveyors is described for continuously transporting a mat of curd in succession through a series of sections, namely, drying and de-wheying, fusing, stretching and cheddering, milling, salting and mellowing sections. The apparatus described in this patent enables continuous flow from cheese curd production to salting and mellowing.

Another application of a conveyor belt in cheese processing is found in a method developed by Appenland-Maschinenbau Hain & Co., KG (ALPMA) where a continuous belt is used to form a trough that in turn is subdivided forming a sequence of sections which enable continuous flow through from cheese curd production through salting and mellowing using a single endless conveyor belt.

In traditional cheese manufacturing, the coagulation of milk takes place in batches. One cheese vat is filled with milk, other ingredients added to the milk in the vat and finally the rennet is also added to the milk in the vat, stirred for mixing and let still until the whole mass sets and reaches the desired consistency (20–40 minutes).

The prior art of coagulation of ultrafiltered milk approaches the coagulation of retentate by a process utilizing a series of small batches in the form of cylinders or boxes. These containers travel over a conveyor system, entering the filling station where they are filled with precheese, continue moving on to complete the required set time, enter the emptying station where a plunger bottom, or other means, is used to empty the containers. The cheese follows the process and the empty containers are cleaned and sent back to start again the cycle.

In cheese manufacturing with ultrafiltered milk at high concentration, coagulation occurs extremely fast and the resulting curd is very firm (it has the final %TS). Consequently, the mixing of rennet and retentate (ultrafiltered milk) is not done in a vat, which is not suitable to handle the extremely firm curd. The conveyor of the present invention is particularly well adapted for use in the coagulation of mixtures of precheese and coagulant prepared using the mixing method and mixing device described in my copending patent application Ser. No. 08/694/229, filed simultaneously herewith on the same day as the present application and entitled APPARATUS FOR MIXING FLUIDS AND METHOD OF USE IN PRECHEESE FORMATION, the teaching of which is incorporated herein by reference thereto. Described therein is an in-line mixer which is used to mix the rennet and retentate in an extremely short time and deliver the mix to the receiving bay of a continuous coagulator.

The precheese which is mixed with coagulant to form the feed that is treated in accordance with the present invention is suitably formed by ultrafiltration using ultraafiltration devices described in my copending application, Ser. No. 08/694,125, also filed simultaneously herewith on the same day as the present application and entitled ANTI-TELESCOPING DEVICE FOR SPIRAL WOUND MEMBRANE MODULES, the teaching of which is incorporated herein by reference thereto.

In accordance with the present invention, a continuous stream of precheese is processed to provide a corresponding coagulated precheese formed in transit over a conveyor belt which is adapted to receive and carry the precheese over the course of solidification whereby a stream of precheese at the receiving end of the conveyor may be withdrawn at the other end as a continuous "rope" of cheese product.

SUMMARY OF THE INVENTION

The objectives of the present invention are:
a. Synchronization/adjustment of the coagulation process to precheese produced by a preceding mixing process to maintain a set time that is the same for all the precheese.
b. Mechanical simplicity of a continuous, unencumbered movement of solidifying precheese, avoiding the repetition of the start-stop sequence associated with the small batches approach of the prior art.
c. Avoidance of relative movement during coagulation to obtain a curd/coagulant with homogeneous texture. The coagulating mass travels with the "container" (the conveyor belt) without the disturbances of start-stop.

The present invention, in its broadest aspect, relates to a method of coagulating a continuous feedstream of a mixture of (1) precheese which is a cheese precursor, the composition of which corresponds to the final cheese product with (2) coagulant. The mixture is deposited in a continuous stream into a moving receptacle which has an open downstream end. The downstream end of the admixture is coagulated before such downstream end of the coagulated admixture reaches the open downstream end of the receptacle. The admixture, after deposition on the moving receptacle, does not move in relation to the receptacle before being discharged at the open downstream end of the moving receptacle. Coagulated admixture is recovered from the open downstream end of the receptacle in coagulated form (solid form) for use thereafter or for further treatment.

The present invention, in specific application, uses a conveyor belt system to achieve continuous coagulation of a mixture of (1) precheese also referred to herein as ultrafiltered dairy product and retentate (2) a coagulant, suitably rennet. A solid cheese product is provided in the form of a continuous ribbon as the coagulated precheese is discharged at the downstream/discharge end of the conveyor.

This is achieved by introducing the admixture into a temporary compartment formed on a U-shaped conveyor belt having a downstream end. The temporary compartment is delimited by sides and a bottom which are formed by the interior surface of said U-shaped conveyor belt, an upstream closed end formed by providing an upstream end of the conveyor belt which is above the bottom of the U-shaped top working surface of the belt to provide a permanent upstream dam, and a downstream temporary end that is formed by a temporary downstream dam placed upon and conforming to the interior surface of the U-shaped conveyor belt. This temporary dam retains the admixture within the temporary compartment until the downstream end portion of the mixture solidifies enough to form what can be referred to as a continuous dam situs at a point upstream of the discharge end of the conveyor. The temporary dam is removed after a sufficient portion of the admixture retained by said dam has coagulated thereby forming a permanent dam situs at the locus of such coagulation.

The continuing advancement of the conveyor belt conveys coagulated admixture to the open downstream end of the conveyor belt. There the coagulated admixture is recovered.

The speed of the conveyor and rate of admixture introduction are controlled to maintain the level of admixture within the pocket (U) of the U-shaped belt at a predetermined level and to maintain the permanent dam situs upstream of the open end of the conveyor belt.

The coagulated precheese, which is recovered, typically is in the form of a continuous ribbon/string and may be further treated prior to being cut into segments of desired size and weight.

The term precheese as used herein refers to a cheese precursor, the composition of which corresponds to the final cheese product. Precheese is the cheese precursor concentrate prior to addition of a coagulating agent. The concentrate can be salted and acidified and may contain other additives.

Although the conveyor system herein described is used for continuous processing of a viscous liquid precheese, the system is adapted for use with any precheese that changes form, that is, coagulates and thereby creates a continuous dam situs which forms a coagulating "compartment" through which coagulating precheese flows at a rate determined by the conveyor belt speed selected. The conveyor system and method of the present invention, for example, can be used for precheese slurries and other forms of fluid precheese which while on the conveyor produce an appropriate coagulate.

The parameters of belt speed, size of the U-shaped compartment and the like can be varied depending on coagulation rate and other factors dependent on precheese properties.

An elevated upstream/feed end of the conveyor can be provided in any number of ways in addition to the formation of U-shape, which alone provides a suitable architecture for the feed receiving end, including raising the roller at the upstream end of the conveyor and/or raising the upstream end of the conveyor. The use of a level conveyor belt with a roller above the level of the liquid feed being conveyed forming the upstream dam end is preferred.

The U-shape of the conveyor belt (or its equivalent) likewise may be formed by known methods not a part of the present invention, such as bringing the edges on the conveyor working surface in by roller means.

The open end of the conveyor belt may be level, lowered by lowering the downstream (discharge) end or the open end may be at the same or even higher level than the inlet end of the conveyor. The objective of the present invention is to provide a continuous coagulated precheese product. At the discharge end, a continuous ribbon (rope/string) of cheese is discharged or drawn off. Provided this procedure is not adversely affected, the discharge end of the conveyer is open and functions to discharge the solid rope product at, above, or below the closed end.

DETAILED DESCRIPTION OF THE INVENTION

Figure 1:
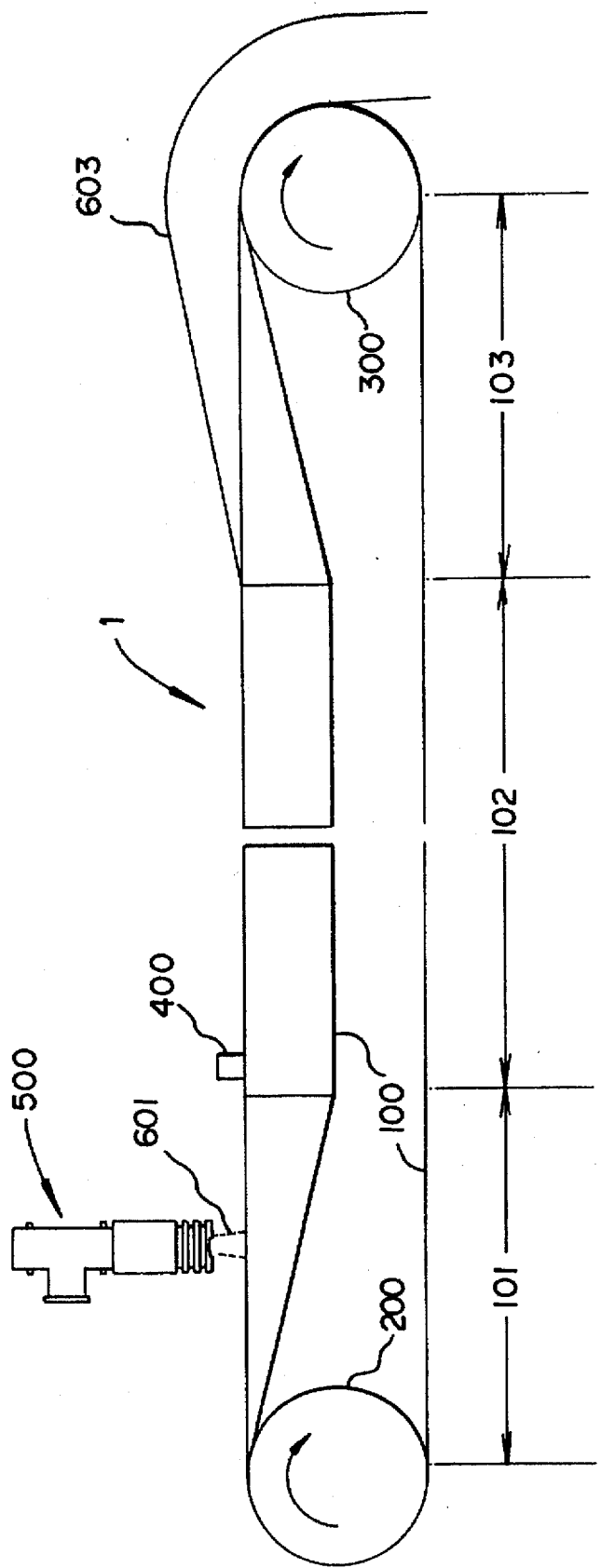
FIG. 1 is a schematic view of the conveyor belt coagulator shown with mixer for retentate and coagulant.
Figure 2:
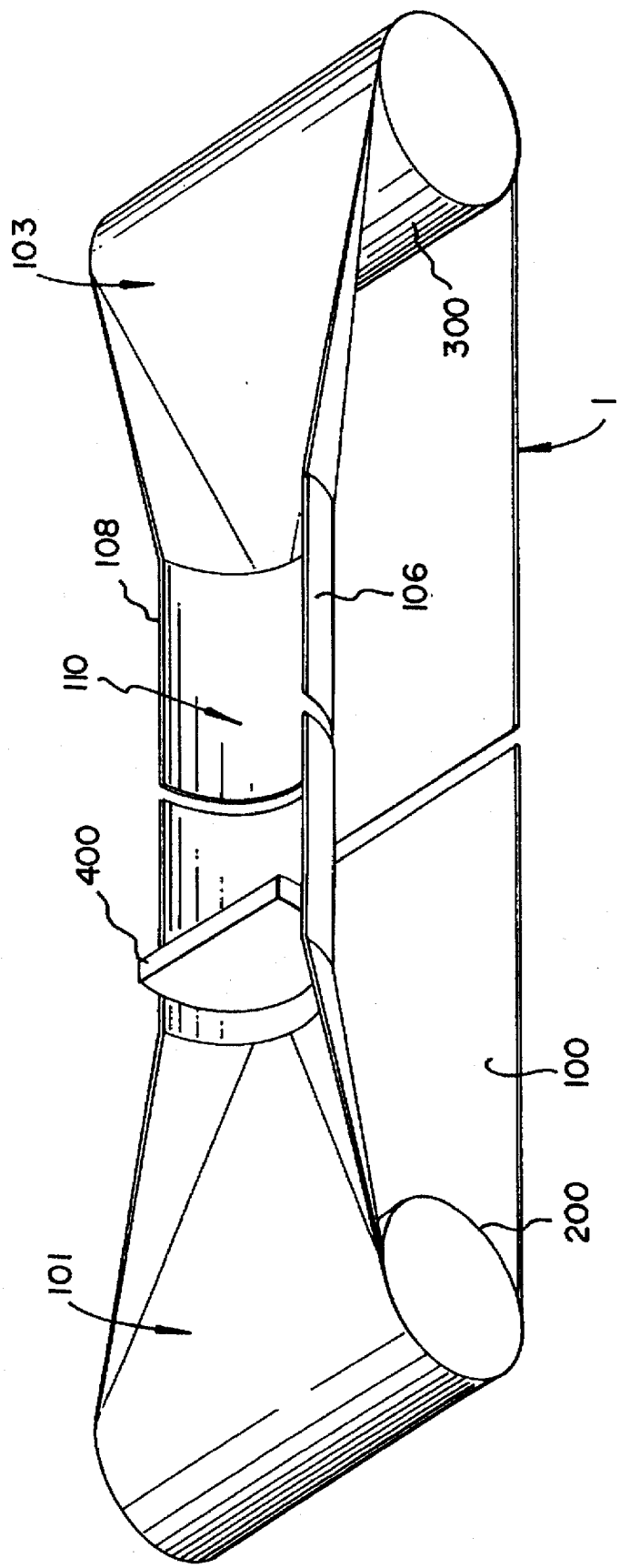
FIG. 2 is a schematic view of the coagulator conveyor belt.

As shown in FIGS. 1 and 2, the coagulator of the present invention is a modified conveyor 1 wherein a flexible conveyor belt which is flat at driving cylinder 300 and guiding cylinder 200 is formed by known means such as rollers intermediate inlet end 101, also referred to as the reception bay, and the outlet end 103, also referred to in the alternative as the discharge end or delivery bay. By using rollers or the like to force the edges of the belt 106 and 108 toward one another, a pocket of semicylindrical shape 110, herein also referred to as the U-shaped section, is formed. Such pocket retains and transports the precheese and coagulant admixture during solidification.

At start-up time, a retention dam 400 is installed at the downstream end/beginning of the semicylindrical section to contain the liquid mix comprising the precheese. The objective is to prevent movement of precheese mixture relative to the belt during transport/solidification. A suitably sized flexible bag filled with a liquid, such as water, that will conform to the walls of the belt, serves this purpose adequately. The mixer 500 is positioned to continuously feed liquid retentate 601 at the inlet end into the reception bay. The mix sets in 3–20 minutes while traveling along in the U-shaped coagulating section 102. At the outlet end of the conveyor, the mass is already solid and forms a ribbon that detaches itself from the belt at the beginning of the delivery bay 103, where the belt opens up and starts to flatten to meet the driving cylinder. The cheese ribbon 603 is then discharged and picked up for further processing.

The conveyor belt 100 is made of a flexible polymer appropriate for food contact. Flexibility is required because the belt is continuously changing shape from flat to semicylindrical in the reception bay and the other way around in the delivery bay.

In the reception bay, the belt starts curving to gradually adopt the semicylindrical shape. The upper edges are leveled with the guiding cylinder.

The liquid precheese is delivered by mixer 500 into the reception bay and contained, at start time, by retention dam 400. As the liquid precheese advances downstream and solidifies in the conveyor, the necessary retention for the liquid mix is provided by the downstream solidified cheese—a part of the liquid precheese—semi-solid (solidifying) cheese—solid cheese continuum.

In the coagulating section 102 where the conveyor belt 100 is formed into semicylindrical shape, the mix is liquid at the beginning of the section. The coagulation process progresses in a continuous mode as the precheese is conveyed by the conveyor. The time required for a full coagulation depends on the cheese type being manufactured. In general, this time falls between 3 and 20 minutes. By the time the cheese reaches the end of this section, the cheese is solid with a firm texture.

In the delivery bay, the curved belt opens up and starts to flatten. The cheese is firm and detaches itself from the belt walls forming a loose ribbon, ready for further processing. The ribbon could also be denominated as string or rope. In any case, the configuration is dependent on the form endowed by the inner configuration of the belt. The form of the cheese, ease in handling same, ease of maintaining sanitary conditions and the capability of "cutting off" varying increments (weights) as required are advantages that result from the method of the present invention.

After discharging/delivering the cheese ribbon, the conveyor belt turns down and around the driving cylinder 300 on its way back to the guiding cylinder 200 to repeat the cycle.

The surface of the returning belt is flat, with its working surface facing down which facilitates cleaning before the belt reaches guiding cylinder 200.

Guiding cylinder 200, where continuous cleaning is used during return, will receive a clean belt. The change of shape of the belt to form receiving bay 101 is initiated after the belt traverses cylinder 200. Cylinder 200 may include means (not shown) for guiding the belt and maintaining it aligned.

Driving cylinder 300, a typical motorized cylinder, pulls the belt and maintains the proper speed to synchronize movement of the belt with the flow of retentate originating from mixer 500.

At the beginning of the operation, the liquid precheese mixture is delivered by the mixer into a "cavity" formed by the reception bay 101 of the conveyor and the retention dam 400. The conveyor belt is not moving at this time and remains still until the liquid precheese fills the "cavity" to a preselected level. The preselected level depends on the type of cheese being manufactured and ribbon size selected in keeping with handling required after discharge.

Once the preselected level is reached, the conveyor belt is started and begins moving forward. The linear speed of the conveyor belt is then adjusted to maintain the constant level of liquid precheese selected in the reception bay, thus producing a ribbon of solid cheese of substantially uniform thickness, ready for further processing.

In the present invention, the retention dam device is used only during start-up to substitute for the mass of solid cheese, not yet formed, and provides means for retaining the liquid mix, preventing it from running off and enabling the liquid mix to reach the appropriate level in the reception bay. The retention dam travels with the belt and is typically removed when it reaches the delivery bay. At this point in time, a solid ribbon of cheese has been formed and the retention dam is no longer needed to continue the process.

It is not intended to limit the method and/or apparatus of the present invention to the particular embodiment described herein, and various modifications may be made, including, but not limited to, changes in dimensions, shape and materials, without departing from the scope and spirit of the invention as set forth in the following claims.

I claim:

1. A method of coagulating a continuous feedstream of precheese admixed with coagulant to produce a continuous ribbon of cheese which comprises depositing said admixture in a continuous stream in a moving flexible U-shaped receptacle having a downstream end; coagulating said admixture prior to reaching the downstream end, said admixture, after deposition on the moving receptacle, moving in fixed relation to said receptacle prior to traversing the downstream end of the moving receptacle; and, recovering the coagulated admixture from said downstream end of the receptacle in continuous coagulated ribbon form.

2. A method of continuous coagulation of a precheese which comprises:

(a) introducing an admixture of precheese and coagulant into a temporary compartment formed on a U-shaped conveyor belt having a downstream end, said temporary compartment delimited by sides and a bottom which are formed by the interior surface of said U-shaped conveyor belt, an upstream closed end formed by elevating the conveyor belt above said temporary compartment bottom to provide a permanent upstream dam, and a downstream end formed by a temporary downstream dam placed upon and conforming to the interior surface of the U-shaped conveyor belt to retain admixture within the temporary compartment;

(b) advancing the conveyor belt in a downstream direction and continuing introduction of said liquid admixture downstream of the upstream dam;

(c) removing the temporary dam after a sufficient portion of the admixture retained by said temporary downstream dam has coagulated, said coagulated mixture thereby forming a permanent dam situs at a locus of coagulation;

(d) continuing to advance the conveyor belt to thereby convey coagulated admixture to the downstream end of the conveyor belt; and (e) recovering coagulated admixture at said downstream end.

3. The method of claim 2, including the step of advancing said conveyor belt and controlling the rate of admixture introduction to maintain the admixture within the U-shaped belt at a predetermined level and to maintain the permanent dam situs upstream of the downstream end of the conveyor belt.

4. The method of claim 3, wherein the precheese is comprised of ultrafiltered milk and the coagulant is rennet.

5. The method of claim 4, wherein the recovered coagulated admixture is discharged in the form of a ribbon.

* * * * *